United States Patent
Jung et al.

(10) Patent No.: US 7,493,552 B2
(45) Date of Patent: Feb. 17, 2009

(54) METHOD TO DISPLAY A MARK-UP DOCUMENT ACCORDING TO A PARENTAL LEVEL, METHOD AND APPARATUS TO REPRODUCE THE MARK-UP DOCUMENT IN AN INTERACTIVE MODE, AND A DATA STORAGE MEDIUM THEREFOR

(75) Inventors: Kil-soo Jung, Gyeonggi-do (KR); Sung-wook Park, Seoul (KR); Hyun-kwon Chung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 322 days.

(21) Appl. No.: 10/612,415

(22) Filed: Jul. 3, 2003

(65) Prior Publication Data
US 2004/0060009 A1   Mar. 25, 2004

(30) Foreign Application Priority Data
Jul. 5, 2002   (KR)   .................. 10-2002-0038880
Jan. 4, 2003   (KR)   .................. 10-2003-0000436

(51) Int. Cl.
*G06F 17/00*   (2006.01)
(52) U.S. Cl. ............. 715/201; 715/202; 715/203; 715/234; 715/201; 725/28; 386/45; 386/94; 386/125; 386/126
(58) Field of Classification Search ............. 715/500.1, 715/201–204, 234; 709/219; 725/38, 25–31, 725/37–61; 386/45, 94, 125–126
See application file for complete search history.

(56) References Cited

U.S. PATENT DOCUMENTS

| 5,684,715 | A |   | 11/1997 | Palmer |
| 6,421,726 | B1 | * | 7/2002 | Kenner et al. ............. 709/225 |
| 6,510,458 | B1 | * | 1/2003 | Berstis et al. ............. 709/219 |
| 2002/0059603 | A1 |   | 5/2002 | Kelts |
| 2002/0088011 | A1 |   | 7/2002 | Lamkin et al. |
| 2006/0117344 | A1 | * | 6/2006 | Lamkin et al. ............. 725/38 |

FOREIGN PATENT DOCUMENTS

| EP | 1 006 459 | 6/2000 |
| JP | 10-136314 | 5/1998 |

OTHER PUBLICATIONS

U.S. Appl. No. 10/777,900, filed Feb. 13, 2004, Kil-soo Jung et al., Samsung Electronics Co., Ltd.
U.S. Appl. No. 10/777,758, filed Feb. 13, 2004, Kil-soo Jung et al., Samsung Electronics Co., Ltd.
U.S. Appl. No. 10/777,668, filed Feb. 13, 2004, Kil-soo Jung et al., Samsung Electronics Co., Ltd.
European Search Report dated Sep. 13, 2005 of co-pending European Patent Applicaation No. 03738734.7.

* cited by examiner

*Primary Examiner*—Stephen S Hong
*Assistant Examiner*—David Faber
(74) *Attorney, Agent, or Firm*—Stein, McEwen & Bui, LLP

(57) ABSTRACT

Provided are a method to display a mark-up document according to a parental level, a method and an apparatus for reproducing AV data in an interactive mode, and a data storage medium. The data storage medium includes the AV data, and mark-up documents to reproduce the AV data in an interactive mode. Here, among the mark-up documents, a start-up document contains information on the mark-up documents to be displayed according to a set parental level.

11 Claims, 7 Drawing Sheets

METHOD TO DISPLAY A MARK-UP DOCUMENT ACCORDING TO A PARENTAL LEVEL, METHOD AND APPARATUS TO REPRODUCE THE MARK-UP DOCUMENT IN AN INTERACTIVE MODE, AND A DATA STORAGE MEDIUM THEREFOR

CROSS-REFERENCE TO RELATED APPLICATIONS

This application claims the priority of Korean Patent Application Nos. 2002-38880 and 2003-436 filed on Jul. 5, 2002 and Jan. 4, 2003, respectively, in the Korean Intellectual Property Office, the disclosure of which is incorporated herein in its entirety by reference.

BACKGROUND OF THE INVENTION

1. Field of the Invention

The present invention relates to a method and an apparatus for reproducing a mark-up document according to a parental level, and a data storage medium.

2. Description of the Related Art

Digital versatile disks (DVD) that enable AV data recorded thereon to be reproduced in an interactive mode in a PC-based environment, i.e., interactive DVDs, are being sold in the market place. On the interactive DVD, the AV data is recorded according to conventional DVD-video standards, and a mark-up document for supporting interactive functions is further recorded. The AV data recorded on the interactive DVD can be displayed in two different modes. One way to display the AV data is a video mode, which is the same as a conventional DVD-video mode, i.e., the way AV data recorded on a typical DVD is displayed, and the other is an interactive mode in which an AV screen on which the AV data reproduced from the interactive DVD and displayed together with an embedded mark-up document. For example, in a case where the AV data is a movie title, moving images are displayed in a display window of a screen, and various interactive contents including a film script, a synopsis, and actors and actresses' photos, can be displayed on the rest of the screen. The interactive contents can be displayed on a screen in synchronization with the AV data, such as a movie title. For example, the mark-up document containing a specific actor or actress' personal history may be drawn from a data storage medium and displayed when the specific actor or actress appears on the screen while a movie title is reproduced.

However, some interactive content that can be displayed in an interactive mode with the help of mark-up documents may not be appropriate for minors to view.

SUMMARY OF THE INVENTION

According to an aspect of present invention, there is provided a data storage medium on which mark-up documents are recorded to control in an interactive mode a display of interactive content inappropriate for minors, and a method and an apparatus for reproducing data from the data storage medium.

According to an aspect of the present invention, there is provided a data storage medium on which mark-up documents are recorded to control in an interactive mode a display interactive content inappropriate for minors, and a method and an apparatus for reproducing data from the data storage medium.

According to an aspect of the present invention, there is provided a method for reproducing a mark-up document so that interactive content inappropriate for minors can be prevented from being viewed by minors.

According to an aspect of the present invention, there is provided a data storage medium including AV data, and mark-up documents necessary for reproducing the AV data in an interactive mode. Here, among the mark-up documents, a start-up document contains information on mark-up documents to be displayed according to a set parental level.

According to an aspect of the present invention, the information of the start-up document includes meta-information on a parental level, a set parental level, and link information on a mark-up document corresponding to the parental level in the meta-information.

According to an aspect of the present invention, the link information includes information of a mark-up document to be displayed when the set parental level is lower than the parental level in the meta-information and information of a mark-up document to be displayed when the set parental level is not lower than the parental level in the meta-information.

According to an aspect of the present invention, the information of the start-up document is link information indicating a path of the mark-up document corresponding to the set parental level.

According to another aspect of the present invention, there is provided a data storage medium including AV data, and a plurality of mark-up documents to reproduce the AV data in an interactive mode and corresponding to at least two different parental levels.

According to another aspect of the present invention, there is provided a data storage medium including a video directory where AV data is stored, and an interactive directory where data to reproduce the AV data in an interactive mode is stored. Here, the interactive directory has a plurality of sub-directories corresponding to at least two different parental levels, and in each of the plurality of sub-directories, mark-up documents corresponding to a corresponding parental level are stored.

According to another aspect of the present invention, there is provided a data storage medium including a video directory where AV data is stored, and an interactive directory where a start-up document that is a mark-up document to reproduce the AV data in an interactive mode is stored. Here, the interactive directory has a plurality of sub-directories corresponding to at least two different parental levels, in each of the plurality of sub-directories, a plurality of mark-up documents corresponding to a corresponding parental level are stored, and the start-up document contains link information on the plurality of mark-up documents stored in each of the sub-directories.

According to an aspect of the present invention, the link information is written using a link tag.

According to another aspect of the present invention, there is provided a data storage medium including AV data, a mark-up document to reproduce the AV data in an interactive mode, and display rule information to display the mark-up document so as to correspond to a set parental level.

According to an aspect of the present invention, the display rule information includes information indicating whether to display elements of the mark-up document corresponding to at least two different parental levels.

According to an aspect of the present invention, the display rule information is written according to cascading style sheets (CSS) rules.

According to an aspect of the present invention, a class value is allotted to at least one of the elements of the mark-up document, and the display rule information includes information indicating whether to display the element to which the class value is allotted.

According to an aspect of the present invention, the display rule information is written in the form of a CSS file.

According to an aspect of the present invention, the AV data is DVD-video data, and the parental level meets DVD-video standards.

According to another aspect of the present invention, there is provided a data storage medium including AV data, and a mark-up document to reproduce the AV data in an interactive mode and containing a manner in which another mark-up document written in a Script language so as to meet a parental level that has been set in advance.

According to an aspect of the present invention, the mark-up document is written so that it can be linked to a script file written in a script language or a CSS file.

According to another aspect of the present invention, there is provided a method to reproduce AV data in an interactive mode. The method includes identifying a set parental level, and reproducing the AV data in an interactive mode using a mark-up document corresponding to the identified parental level.

According to an aspect of the present invention, the reproducing of the AV data includes identifying the parental level included in meta-information written in the mark-up document designated as a start-up document, and reproducing the AV data using a mark-up document selected based upon the result of comparing the parental level identified with the parental level identified in the meta-information as the set parental level.

According to an aspect of the present invention, the AV data is reproduced in the interactive mode using the mark-up document presenting a warning message indicating that interactive content cannot be displayed when the parental level included in the meta-information is lower than the set parental level.

According to another aspect of the present invention, there is provided a method to reproduce AV data in an interactive mode. The method includes identifying a set parental level, reading a mark-up document in a sub-directory corresponding to the set parental level among sub-directories of an interactive directory, and reproducing the AV data in an interactive mode using the read mark-up document.

According to another aspect of the present invention, there is provided a method to display a mark-up document according to a parental level. The method includes identifying a predetermined value allotted to an element of a mark-up document, and determining whether to display the predetermined element depending on the predetermined value based on display rule information.

According to another aspect of the present invention, there is provided a method to reproduce AV data in an interactive mode using a mark-up document. The method includes identifying a class value allotted to an element of a mark-up document, determining whether to display the element or not depending on the class value and referring to display rule information, and embedding an AV screen obtained by reproducing the AV data in a mark-up screen obtained as a result of the determination and displaying a result of the embedment.

According to an aspect of the present invention, there is provided the display rule information is written according to CSS rules.

According to an aspect of the present invention, there is provided the display rule information is written in the form of a CSS file.

According to another aspect of the present invention, there is provided an apparatus to reproduce AV data in an interactive mode using a mark-up document. The apparatus includes a data storage medium, a reader which reads the mark-up document and the AV data from the data storage medium, an AV decoder which decodes the AV data, a presentation engine which identifies a predetermined value allotted to an element of the mark-up document and determines whether to display the element depending on the predetermined value and referring to display rule information, and a blender which blends the mark-up document interpreted by the presentation engine and an AV screen to reproduce the AV data.

According to an aspect of the present invention, there is provided the display rule information is written according to CSS rules.

According to an aspect of the present invention, there is provided the display rule information is written in the form of a CSS file.

A reproduction system, including: a data storage medium; an apparatus to reproduce AV data recorded on the data storage medium in an interactive mode using a mark-up document corresponding to the AV data; and a display device to display a mark-up screen obtained using the mark-up document with an AV screen obtained by reproducing the AV data, wherein the AV screen is embedded in the mark-up screen.

An apparatus to reproduce data from a data storage medium, including: a reader reading the data from the data storage medium; and a controller outputting a control signal to the reader to read AV data and a mark-up document from the data storage medium, wherein, in an interactive mode, the controller interprets the mark-up document corresponding to a parental level set by a user indicative of whether to reproduce the AV data recorded on the data storage medium.

A method to reproduce AV data in an interactive mode, including: selecting the interactive mode; identifying a parental level set by a user; identifying the parental level written in a mark-up document designated as a start-up document; comparing the parental level recorded in the mark-up document with the parental level set by the user; reproducing the AV data in the interactive mode using the mark-up document with a warning message indicating that the interactive content corresponding to the AV data cannot be displayed when the parental level written in the start-up document is higher than the parental level set by the user; and reproducing the AV data in the interactive mode using the mark-up document including the interactive content to the AV data when the parental level written in the start-up document is not higher than the parental level set by the user.

A method to display a mark-up document, including: identifying a parental level set by a user; identifying a class value allotted to a predetermined element of the mark-up document; determining whether to display the predetermined element based upon the parental level identified and the class value allotted to the predetermined element; and displaying the predetermined element.

A method to reproduce AV data in an interactive mode using a mark-up document, including: identifying a parental level set by a user; identifying a class value assigned to a predetermined element of the mark-up document; determining whether to display the predetermined element based upon the parental level identified and the class value and with reference to display rule information; and embedding and displaying an AV screen obtained by reproducing the AV data in the mark-up screen.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DETAILED DESCRIPTION OF THE INVENTION

Figure 1:
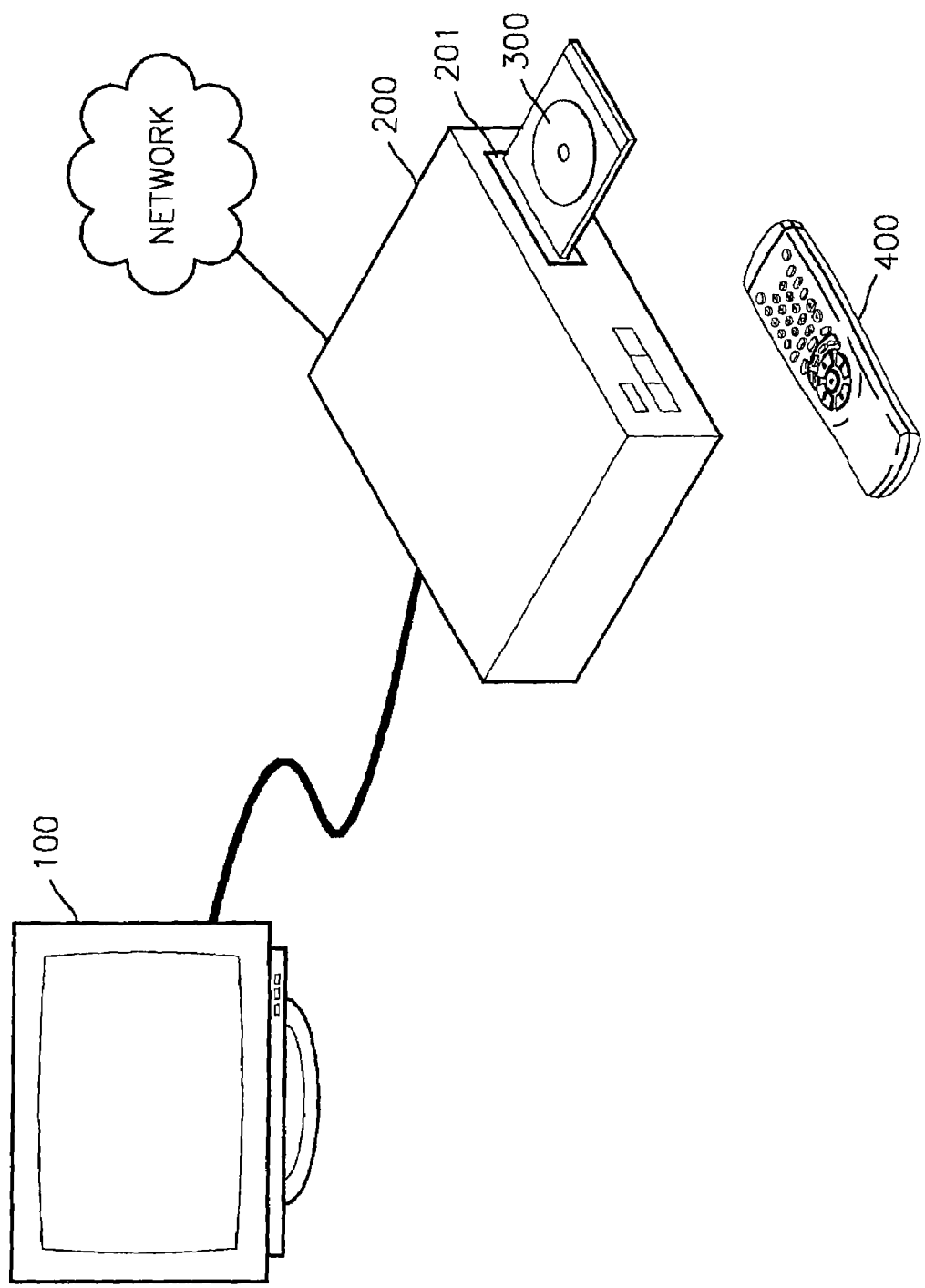
FIG. 1 is a schematic diagram illustrating a reproduction system, according to an aspect of the present invention.

Reference will now be made in detail to the aspects of the present invention, examples of which are illustrated in the accompanying drawings, wherein like reference numerals refer to like elements throughout. The aspects are described below in order to explain the present invention by referring to the figures.

According to an aspect of the present invention, 'mark-up document' includes all documents written in the mark-up language, such as HTML or XML, and documents where source codes written in a script language or Java is linked or inserted and even represents mark-up resource, such as files linked to a mark-up document. In other words, the mark-up document serves as an application program to reproduce AV data in an interactive mode and contains interactive contents to be displayed together with the AV data.

FIG. 1 is a schematic diagram illustrating a reproduction system, according to an aspect of the present invention. Referring to FIG. 1, the reproduction system includes a DVD 300, which is a data storage medium according to an aspect of the present invention, an apparatus 200 to reproduce data, a TV set 100, which is a display device according to an aspect of the present invention, and a remote controller 400, which is a user input device. The remote controller 400 receives a control command from a user and transmits the control command to the apparatus 200 to reproduce the data. The apparatus 200 to reproduce the data includes a DVD drive 201 to reproduce the data from the DVD 300. When the DVD 300 is loaded onto the DVD drive 201 and the user selects the interactive mode, the apparatus 200 to reproduce the data reproduces the AV data recorded on the DVD 300 in the interactive mode using the mark-up document corresponding to the AV data and transmits the reproduced AV data to the TV set 100. The TV set 100 displays a mark-up screen obtained using the mark-up document with an AV screen obtained by reproducing the AV data. The AV screen is embedded in the mark-up screen. Here, the interactive mode represents a display mode in which the AV data is reproduced, displayed in a display window defined by the mark-up document, i.e., a display mode in which the AV screen displays the AV data and is embedded in the mark-up screen. Here, the AV screen represents a screen displayed on the display device, i.e., the TV set 100, when reproducing the AV data, and the mark-up screen represents a screen displayed on the display device when interpreting the mark-up document. A screen displayed in an interactive mode is called an interactive screen. The interactive screen includes the AV screen and the mark-up screen. A video mode represents a conventional data reproduction mode defined by DVD-video standards, i.e., a mode in which only the AV screen obtained by reproducing the AV data is displayed. In an aspect of the present invention, the apparatus 200 supports both the interactive mode and the video mode.

The apparatus 200 provides a parental level setting button or an on-screen display menu that enables the user to set a parental level. In addition, the apparatus 200 can receive the data from and transmit the data to other devices through a network, such as the Internet.

Figure 2:
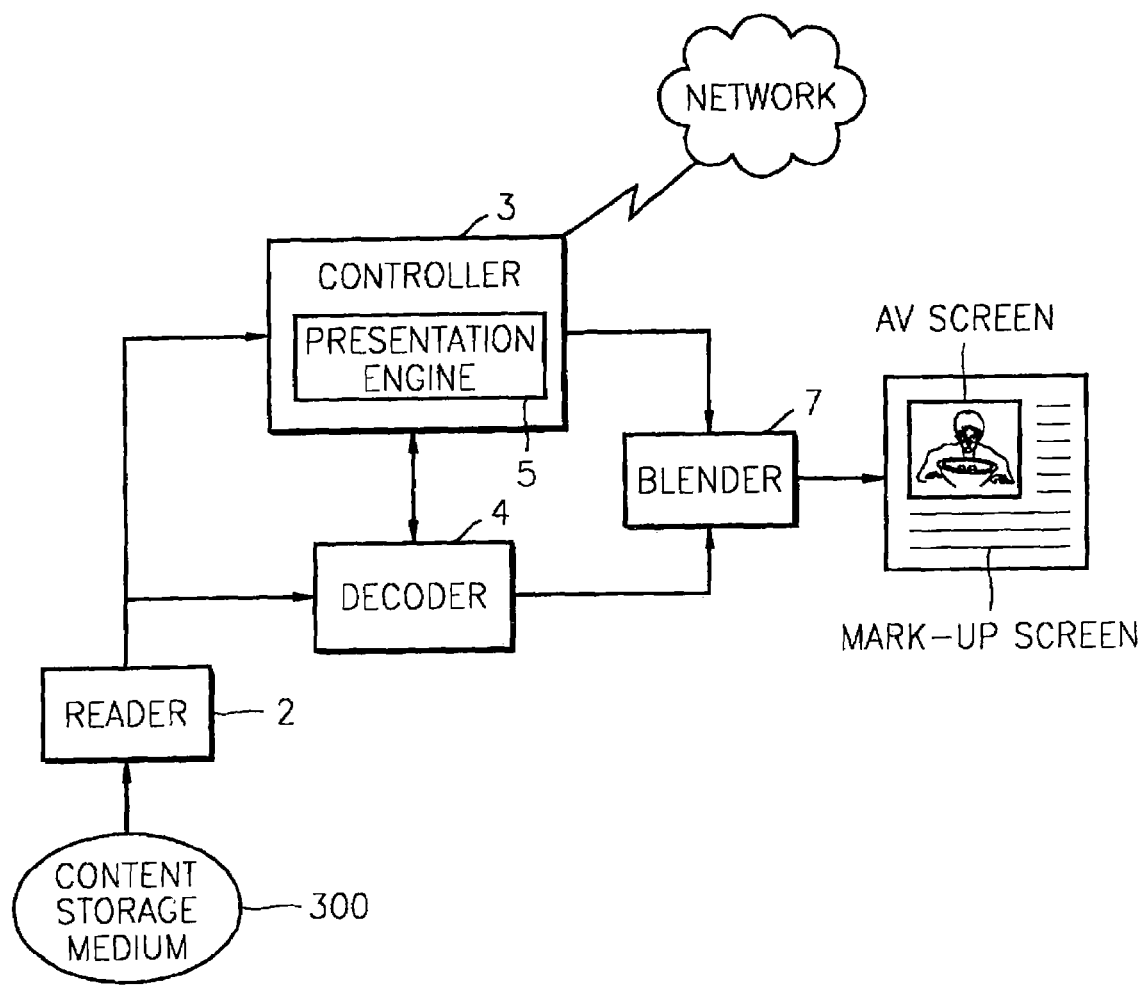
FIG. 2 is a block diagram of an apparatus to reproduce data, according to an aspect of the present invention.

FIG. 2 is a block diagram of an example of the apparatus 200 to reproduce the data, according to an aspect of the present invention. Referring to FIG. 2, the apparatus 200 includes a reader 2, a controller 3, an AV decoder 4, and a blender 7. A presentation engine 5 is provided in the controller 3. An optical pickup (not shown) for reading the data from the DVD 300 by radiating laser beams on the DVD 300 is provided in the reader 2. The reader 2 controls the optical pickup in response to a control signal output by the controller 3 so that the optical pickup reads the AV data and the mark-up document from the DVD 300. The AV decoder 4 decodes the AV data read from the DVD 300. In a case where the AV data has been recorded on the DVD 300 according to the DVD-video standards, the AV decoder 4 decodes the AV data following the DVD-video standards.

From a software point of view, the presentation engine 5 in the controller 3 is an engine for interpreting and executing a mark-up language or a client interpretation program language, such as JavaScript or Java. The presentation engine 5 may further include various plug-ins. Files of various formats included in the mark-up document or linked to the mark-up document can be opened by such plug-ins. For example, Windows Media Player may be called by the presentation engine 5 to reproduce Windows Media Player AV data files. In addition, the presentation engine 5 can retrieve predetermined data, such as the mark-up documents, from other devices through the network.

The presentation engine 5 interprets the mark-up document read from the DVD 300 so as to reproduce the AV data recorded on the DVD 300 in the interactive mode. In other words, the presentation engine 5 identifies the parental level set by the user for the apparatus 200 and interprets the mark-up document in consideration of the parental level.

In an aspect according to the present invention, there are provided five different parental levels, i.e., G, PG, PG13, R, and NC-17, which are the same as those defined by the DVD-video standards for compatibility. The mark-up documents, according to an aspect of the present invention, are provided to reproduce the AV data recorded on the data storage medium according to the DVD-video standards in an interactive mode, and the mark-up documents are provided according to the parental levels for compatibility. The presentation engine 5 uses an application program interface (API) to identify the parental level set for the apparatus 200. The presentation engine 5, however, may use the API defined by conventional interactive DVD-video standards, i.e., InterActual API Specification. The example of the API is as follows.

1. Property

ParentalLevel

2. Summary

Return a current parental level value

3. Return values

ECMAScript Number Signed 1 byte integer

Parental level ranging from 1 to 8 where 1=G, 2=Reserved, 3=PG, 4=PG13, 5=

Reserved, 6=R, 7=NC-17, and 8=Reserved

The user may set the parental level at any of 1, 3, 4, 6, and 7. The presentation engine 5 can identify the parental level set for the apparatus 200 to reproduce the data by using the "ParentalLevel" property of the API.

The blender 7 blends the AV data stream with the interpreted mark-up document so that the AV data stream can be displayed in the display window defined by the mark-up document; in other words, the AV screen can be embedded in the mark-up document screen. Thereafter, the blender 7 outputs the result of the blending to the TV set 100.

Figure 3:
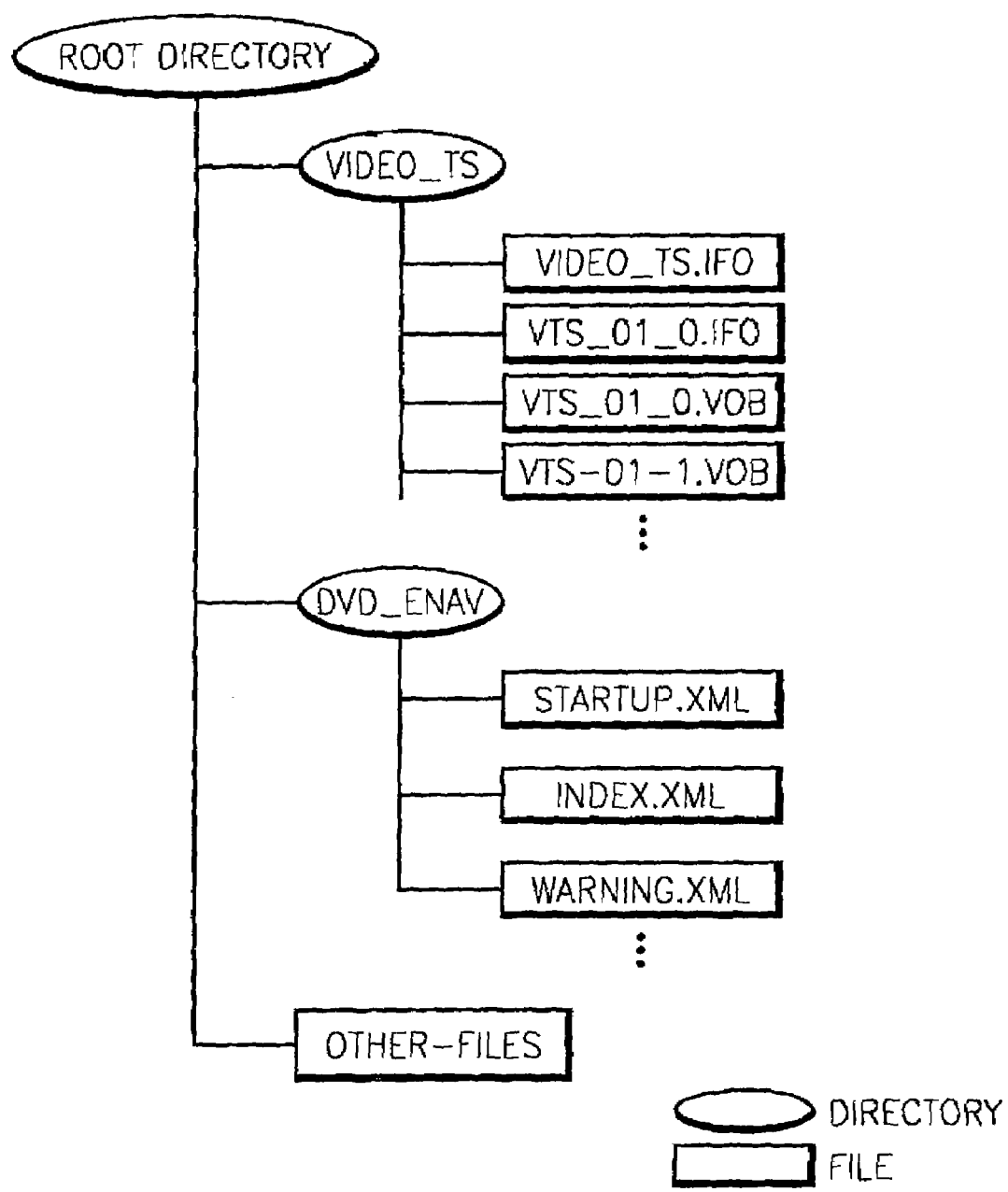
FIG. 3 is a diagram illustrating directories of data recorded on a DVD 300 on which the data is recorded, according to a first aspect of the present invention.

FIG. 3 is a diagram illustrating directories of data recorded on the DVD 300 on which data is recorded, according to a first aspect of the present invention. Referring to FIG. 3, a root directory includes a video directory VIDEO_TS in which the AV data is stored. In the video directory VIDEO_TS, a navigation file VIDEO_TS.IFO containing navigation information of all video title sets is stored. Then, a navigation file VTS_01_0.IFO containing the navigation information of a first video title set, and the AV data VTS_01_0.VOB, VTS_01_1.VOB, . . . , constituting the video title set are recorded. Each of the plurality of the AV data VTS_01_0.VOB, VTS_01_1.VOB, . . . , is a video title, i.e., a video object. Each video object VOB includes a video object unit VOBU, which is a package of a navigation pack, a video pack, and an audio pack. A detailed structure of VIDEO_TS has been disclosed in 'DVD-Video for Read Only Memory Disc 1.0' dealing with DVD-video standards.

An interactive directory DVD_ENAV is provided as a sub-directory of the root directory. In the interactive directory DVD_ENAV, mark-up documents for supporting an interactive mode are stored. In particular, in the interactive directory DVD_ENAV, a start-up document STARTUP.XML, and mark-up documents INDEX.XML and WARNING.XML for selectively showing a parental level are stored. In addition, other mark-up documents, i.e., files inserted into STARTUP.XML, INDEX.XML, and WARNING.XML, are also stored in the interactive directory DVD_ENAV.

The start-up document STARTUP.XML contains the parental level information and link information. In an aspect of the present invention, the parental level information is a parental level written in the start-up document STARTUP.XML, and the link information is the mark-up document information indicating whether the parental level set by the user is lower or not lower than the parental level written in the start-up document STARTUP.XML. An example of the start-up document STARTUP.XML is as follows.

```
<?xml version="1.0"?>
<!DOCTYPE html
PUBLIC "-//DVD//DTD XHTML DVD HTML 1.0//EN"
"http://www.dvdforum/dvdenav/dvdhtml-1-0.dtd">
<html>
<head>
<title>Startup Page</title>
<meta name="ParentalLevel" contents="4" />
<link rel="FirstPage" href="dvd://dvd_enav/index.xml" />
<link rel="Warning" href="dvd://dvd_enav/warning.xml" />
</head>
</html>
```

The start-up document STARTUP.XML contains meta-information <meta name="ParentalLevel" contents="4" />concerning the parental level and the link information <link rel="FirstPage" href="dvd://dvd_enav/index.xml" /><link rel="Warning" href="dvd://dvd_enav/warning.xml" />. According to the meta-information and the link information, WARNING.XML is displayed on the screen when the parental level set for the apparatus 200 to reproduce the data is lower than 4, and INDEX.XML is displayed on the screen when the parental level set for the apparatus 200 to reproduce the data is not lower than 4.

The presentation engine 5 identifies the parental level set in the apparatus 200 to reproduce the data using the API that has been described above and interprets mark-up documents using meta-information and link information written in a mark-up document designated as a start-up document.

Figure 4:
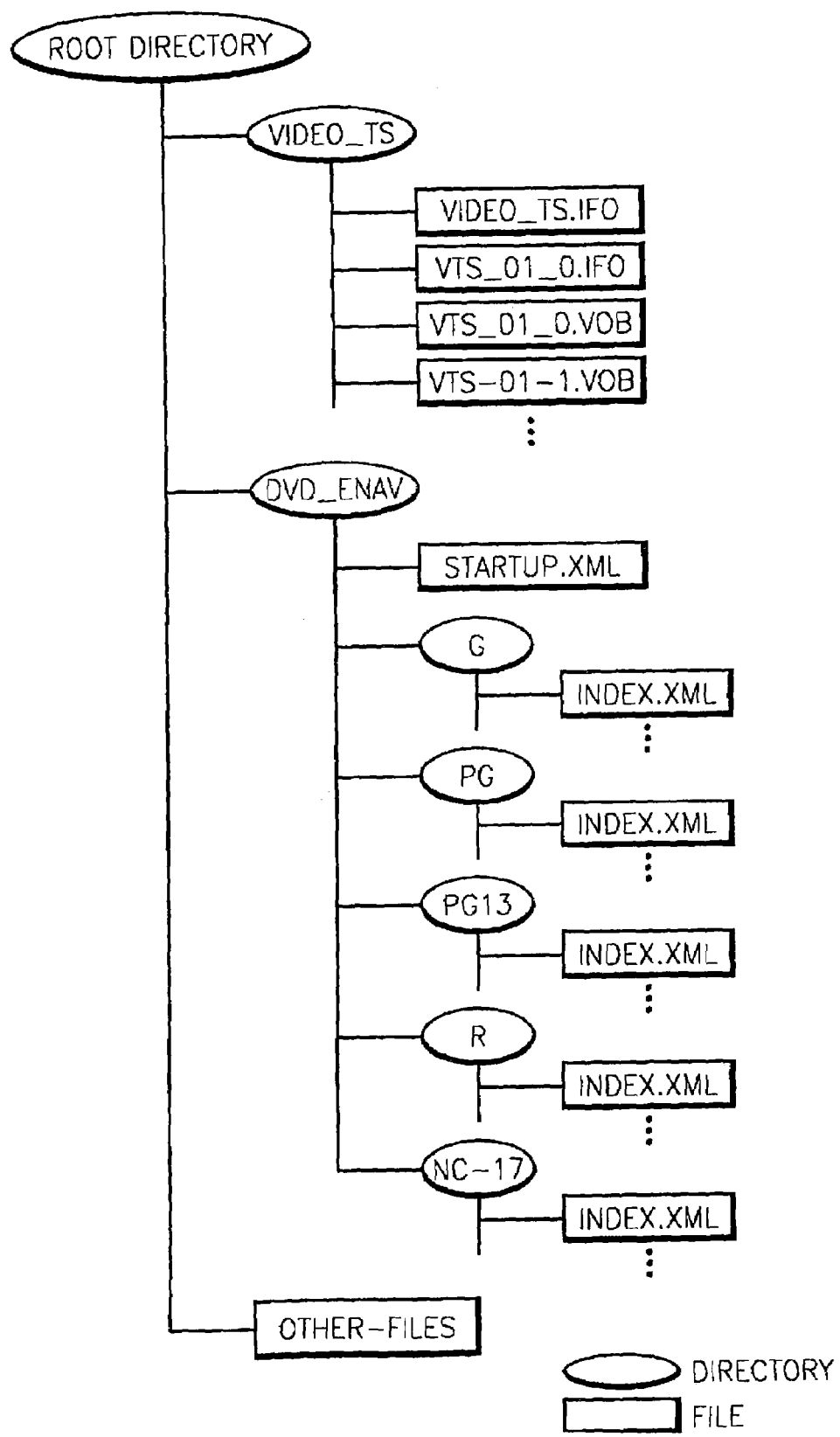
FIG. 4 is a diagram illustrating the directories of the data recorded on the DVD 300 on which the data is recorded, according to a second aspect of the present invention.

FIG. 4 is a diagram illustrating directories of the data recorded on the DVD 300, according to a second aspect of the present invention. Referring to FIG. 4, the root directory includes two sub-directories, i.e., a video directory VIDEO_TS where the AV data is stored and the interactive directory DVD_ENAV where the mark-up documents to support the interactive mode are stored. The video directory VIDEO_TS shown in FIG. 4 is the same as its counterpart shown in FIG. 3, and, thus, its description will be omitted.

In the interactive directory DVD_ENAV, a start-up document STARTUP.XML is stored. In addition, the interactive directory includes sub-directories G, PG, PG13, R, and NC-17 concerning different parental levels. Each of the sub-directories G, PG, PG13, R, and NC-17 contains a mark-up document INDEX.XML corresponding to the parental level. Furthermore, in the interactive directory DVD_ENAV, other mark-up documents, i.e., files inserted into STARTUP.XML or INDEX.XML, are also stored.

In the start-up document STARTUP.XML, link information is stored. In an aspect according to the present invention, the link information includes mark-up document information indicating the parental level set by the user for the apparatus 200 to reproduce the data. An example of the start-up document STARTUP.XML is as follows.

```
<?xml version="1.0"?>
<!DOCTYPE html
PUBLIC "-//DVD//DTD XHTML DVD HTML 1.0//EN"
"http://www.dvdforum/dvdenav/dvdhtml-1-0.dtd">
<html>
<head>
<title>Startup Page</title>
<link rel="1" href="dvd://dvd_enav/G/index.xml" />
<link rel="3" href="dvd://dvd_enav/PG/index.xml" />
<link rel="4" href="dvd://dvd_enav/PG13/index.xml" />
<link rel="6" href="dvd://dvd_enav/R/index.xml" />
```

-continued

```
<link rel="7" href="dvd://dvd_enav/NC-13/index.xml" />
</head>
</html>
```

According to the link information stored in the start-up document STARTUP.XML, INDEX.XML stored in the sub-directory G is displayed when the parental level set for the apparatus 200 to reproduce the data is 1, INDEX.XML stored in the sub-directory PG is displayed when the parental level set for the apparatus 200 to reproduce the data is 3, INDEX.XML stored in the sub-directory PG13 is displayed when the parental level set for the apparatus 200 to reproduce the data is 4, INDEX.XML stored in the sub-directory R is displayed when the parental level set for the apparatus 200 to reproduce the data is 6, and INDEX.XML stored in the sub-directory NC-13 is displayed when the parental level set for the apparatus 200 to reproduce the data is 7.

The presentation engine 5 identifies the parental level set for the apparatus 200 to reproduce the data using an API that has been described above and interprets the mark-up documents using the meta-information and the link information written in the mark-up document designated as a start-up document.

Alternatively, in a case where there are two or more start-up pages provided for each parental level, the start-up pages can be stored in the same directory but have different file names. In this case, the start-up document STARTUP.XML may have the following format and structure.

```
<?xml version="1.0"?>
<!DOCTYPE html
PUBLIC "-//DVD//DTD XHTML DVD HTML 1.0//EN"
"http://www.dvdforum/dvdenav/dvdhtml-1-0.dtd">
<html>
<head>
<title>Startup Page</title>
    <link rel="1" href="dvd://dvd_enav/index_g.xml" />
    <link rel="3" href="dvd://dvd_enav/index_pg.xml" />
    <link rel="4" href="dvd://dvd_enav/index_pg13.xml" />
    <link rel="6" href="dvd://dvd_enav/index_r.xml" />
    <link rel="7" href="dvd://dvd_enav/index_nc_13.xml" />
</head>
</html>
```

Figure 5:
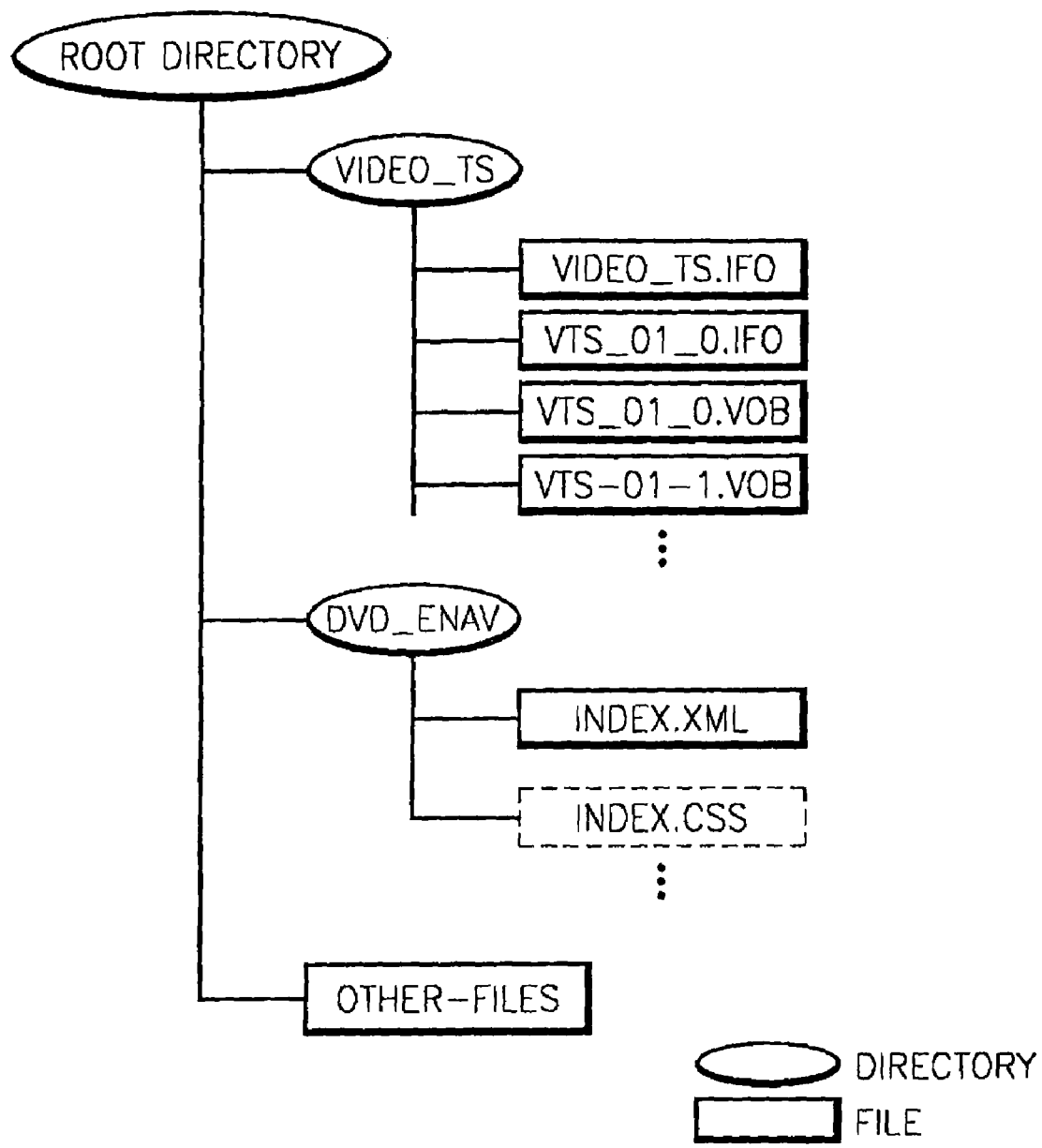
FIG. 5 is a diagram illustrating the directories of data recorded on the DVD 300 on which the data is recorded, according to a third aspect of the present invention.

FIG. 5 is a diagram illustrating the directories of the data recorded on the DVD 300, according to a third aspect of the present invention. Referring to FIG. 5, the root directory includes two sub-directories, i.e., a video directory VIDEO_TS where the AV data is stored and the interactive directory DVD_ENAV where the mark-up documents to support the interactive mode are stored. The video directory VIDEO_TS shown in FIG. 5 is the same as its counterpart shown in FIG. 3, and, thus, a description thereof will be omitted.

In the interactive directory DVD_ENAV, the mark-up document INDEX.XML is stored. In addition, a cascading style sheets (CSS) file indicating the mark-up document INDEX.XML corresponding to the parental level set for the apparatus 200 to reproduce the data is also stored in the interactive directory DVD_ENAV. The CSS file may be included in the mark-up document rather than being provided separately from the mark-up document.

In an aspect according to the present invention, the CSS file contains display rule information. The display rule information is written according to a "@media rule" style defined by CSS standards. An example of "@media rule" defining display rules for target media is as follows.

```
@media print {
    BODY { font-size: 10pt }
}
@media screen {
    BODY { font-size: 12pt }
}
@media screen, print {
    BODY { line-height: 1.2 }
}
```

According to the above "@media rule", the target media is printed out having a font size of 10 and a line space of 1.2 and is displayed on the screen having the font size of 12 and the line space of 1.2.

In an aspect of the present invention, the display rule information written according to CSS standards is as follows.

```
@parentalLevel-display G
{
    .3 {display:box; visibility:hidden;}
    .4 {display:box; visibility:hidden;}
    .6 {display:box; visibility:hidden;}
    .7 {display:box; visibility:hidden;}
}
```

Here, @parentalLevel-display indicates that an element having a "class" attribute value of 3, 4, 6, or 7 sets parameters "display" and "visibility" as "box" and "hidden", respectively, when the parental level is G. In particular, if the parameter "display" is set as "box", box regions are generated and continue to exist even when the box regions are not physically seen. If the parameter "display" is set as "none", generation of all the boxes is banned so that the arrangement of the mark-up documents is more likely to get messed up because even unseen box regions can help arrange the mark-up documents. In other words, by setting the parameter "display" as "box", the mark-up documents can be well arranged. The parameter "visibility" is used to determine whether or not such generated box regions are to be seen.

An example of the mark-up document INDEX.XML including the display rule information written according to CSS standards is as follows.

```
<INDEX.XML>
<?xml version="1.0"?>
<!DOCTYPE html
PUBLIC "-//DVD//DTD XHTML DVD HTML 1.0//EN"
"http://www.dvdforum/dvdenav/dvdhtml-1-0.dtd">
<html>
<head>
<title>Example</title>
<style type="text/css">
@parentalLevel-display G
{
.3 {display:box; visibility:hidden;}
.4 {display:box; visibility:hidden;}
.6 {display:box; visibility:hidden;}
.7 {display:box; visibility:hidden;}
}
@parentalLevel-display PG
{
.4 {display:box; visibility:hidden;}
.6 {display:box; visibility:hidden;}
```

-continued

<INDEX.XML>

```
.7 {display:box; visibility:hidden;}
}
@parentalLevel-display PG13
{
.6 {display:box; visibility:hidden;}
.7 {display:box; visibility:hidden;}
}
@parentalLevel-display R
{
.7 {display:box; visibility:hidden;}
}
@parentalLevel-display NC-17
{
}
</head>
<body>
<img src="dvd://dvd_enav/ ... " class="4" />
<div class="7">........................................</div>
<img src="dvd://dvd_enav/ ... " class="6" />
<div class="3">........................................</div>
...
</body>
</html>
```

As shown in the above example, the parental level value is allotted to each element in the "body" of the mark-up document INDEX.XML as a "class" attribute value. Whether to display each element is determined based upon the display rule information @parentalLevel-display.

An example of the mark-up document INDEX.XML and its display rule information, which is provided as an individual file following CSS standards, i.e., as a file INDEX.CSS, is as follows.

<INDEX.XML>

```
<?xml version="1.0"?>
<!DOCTYPE html
PUBLIC "-//DVD//DTD XHTML DVD HTML 1.0//EN"
"http://www.dvdforum/dvdenav/dvdhtml-1-0.dtd">
<html>
<head>
<title>Example</title>
<link rel="stylesheet" type="text/css" href="index.css">
</head>
<body>
<img src="dvd://dvd_enav/ ... " class="4" />
<div class="7">........................................</div>
<img src="dvd://dvd_enav/ ... " class="6" />
<div class="3">........................................</div>
...
</body>
</html>
```

<INDEX.CSS>

```
@parentalLevel-display G
{
.3 {display:box; visibility:hidden;}
.4 {display:box; visibility:hidden;}
.6 {display:box; visibility:hidden;}
.7 {display:box; visibility:hidden;}
}
@parentalLevel-display PG
{
.4 {display:box; visibility:hidden;}
.6 {display:box; visibility:hidden;}
```

-continued

<INDEX.CSS>

```
.7 {display:box, visibility:hidden;}
}
@parentalLevel-display PG13
{
.6 {display:box; visibility:hidden;}
.7 {display:box; visibility:hidden;}
}
@parentalLevel-display R
{
.7 {display:box; visibility:hidden;}
}
@parentalLevel-display NC-17
{
}
```

Alternatively, the mark-up document INDEX.XML may be written using a script language, such as JavaScript, so as to represent a document appropriate for the corresponding parental level. The script language, which is a programming language, may be used in various manners. An example of the mark-up document INDEX.XML using the script language is as follows.

<INDEX.XML>

```
<?xml version="1.0"?>
<!DOCTYPE html
PUBLIC "-//DVD//DTD XHTML DVD HTML 1.0//EN"
"http://www.dvdforum/dvdenav/dvdhtml-1-0.dtd">
<html>
<head>
<title>Example</title>
<script type="text/Javascript">
if(InteractivDVD.ParentalLevel == 1)
{ classes.3.display="box";
  classes.3.visibility="hidden";
  classes.4.display="box";
  classes.4.visibility="hidden";
  classes.6.display="box";
  classes.6.visibility="hidden";
  classes.7.display="box";
  classes.7.visibility="hidden"; }
if(InteractivDVD.ParentalLevel == 3)
{ classes.4.display="box";
  classes.4.visibility="hidden";
  classes.6.display="box";
  classes.6.visibility="hidden";
  classes.7.display="box";
  classes.7.visibility="hidden"; }
if(InteractivDVD.ParentalLevel == 4)
{ classes.6.display="box";
  classes.6.visibility="hidden";
  classes.7.display="box";
  classes.7.visibility="hidden"; }
if(InteractivDVD.ParentalLevel == 4)
{ classes.6.display="box";
  classes.6.visibility="hidden";
  classes.7.display="box";
  classes.7.visibility="hidden"; }
if(InteractivDVD.ParentalLevel == 6)
{ classes.7.display="box";
  classes.7.visibility="hidden"; }
if(InteractivDVD.ParentalLevel == 7)
{
</script>
</head>
<body>
<img src="dvd://dvd_enav/ ... " class="4" />
<div class="7">........................................</div>
```

-continued

```
<INDEX.XML>

<img src="dvd://dvd_enav/..." class="6" />
<div class="3">.....................................</div>
...
</body>
</html>
```

In the above example of the mark-up document INDEX.XML, "ParentalLevel" that has been described above is used a property for reading a currently set parental level, and ways to represent documents appropriate for their parental levels are written in the script language using simple if-sentences.

The if-sentences are written so that the mark-up document INDEX.XML can be linked to the CSS file and/or the JavaScript file provided separately.

Hereinafter, the method to reproduce the data in the interactive mode, according to an aspect of the present invention, will be described in greater detail based upon the above-described structures of the reproduction system and data written on the DVD 300.

Figure 6:
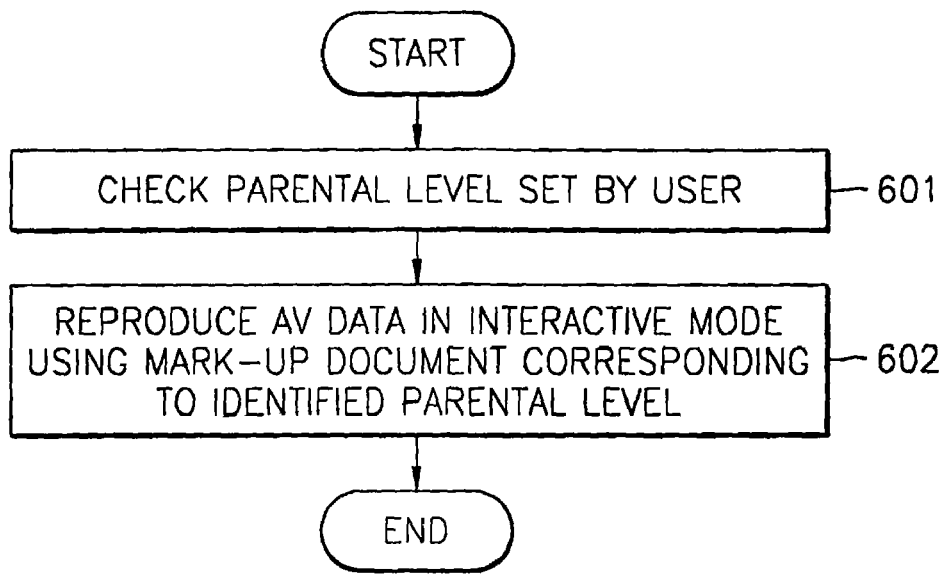
FIG. 6 is a flowchart of a method to reproduce AV data in an interactive mode, according to an aspect of the present invention.

FIG. 6 is a flowchart of the method to reproduce the data in the interactive mode, according to an aspect of the present invention. Referring to FIG. 6, when the interactive mode is selected, at operation 601, the apparatus 200 to reproduce the data identifies the parental level set by the user. Thereafter, at operation 602, the apparatus 200 to reproduce the data reproduces the AV data in the interactive mode using the mark-up document corresponding to the identified parental level.

More specifically, at operation 602, the apparatus 200 to reproduce the data identifies the parental level written in the mark-up document designated as the start-up document and compares the parental level recorded in the mark-up document with the parental level identified at operation 601. If the parental level written in the start-up document is higher than the parental level identified at operation 601, the AV data is reproduced in the interactive mode using the mark-up document with a warning message indicating that the interactive content corresponding to the AV data cannot be displayed. On the other hand, if the parental level written in the start-up document is not higher than the parental level identified at operation 601, the AV data is reproduced in the interactive mode using the mark-up document containing the interactive content corresponding to the AV data.

Figure 7:
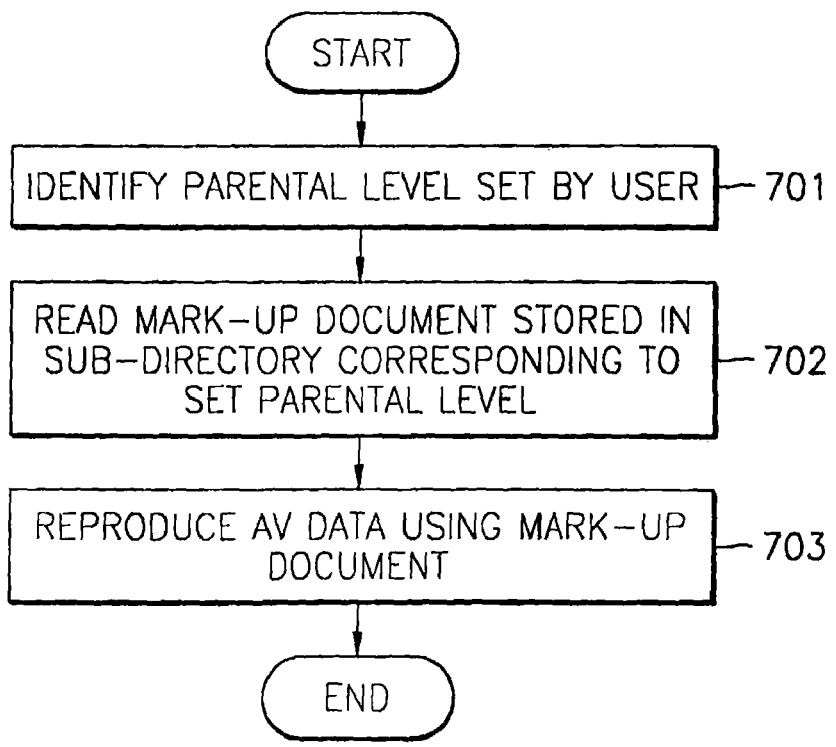
FIG. 7 is a flowchart of a method to reproduce AV data in the interactive mode, according to another aspect of the present invention.

FIG. 7 is a flowchart of a method to reproduce the AV data in the interactive mode, according to an aspect of the present invention.

Referring to FIG. 7, at operation 701, the apparatus 200 to reproduce the data identifies the parental level set by the user. Thereafter, the mark-up document stored in the sub-directory corresponding to the parental level identified at operation 701 among the plurality of sub-directories of the interactive directory is read at operation 702. At operation 703, the AV data is reproduced in the interactive mode using the mark-up document.

Figure 8:
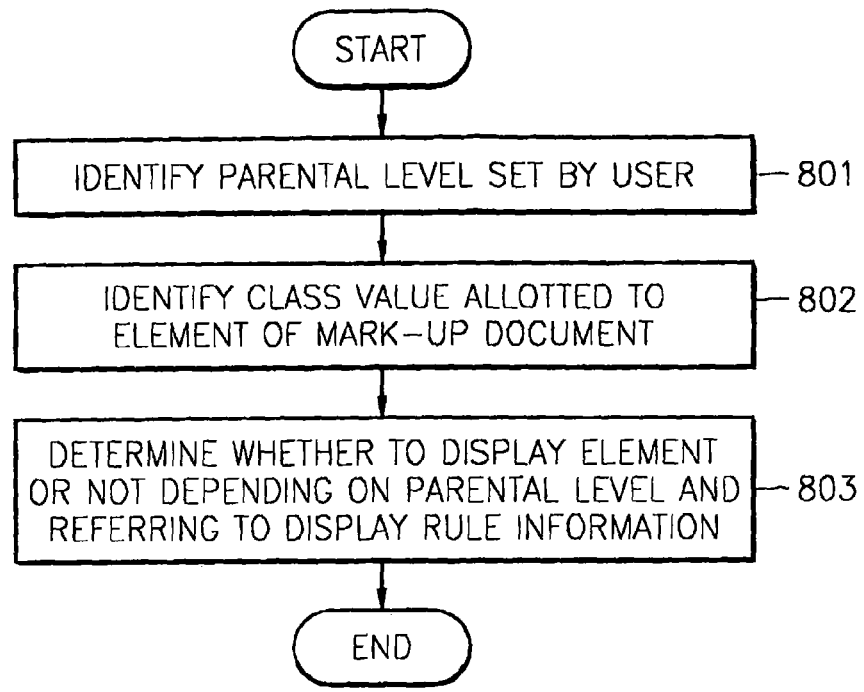
FIG. 8 is a flowchart of a method to display a mark-up document, according to an aspect of the present invention.

FIG. 8 is the flowchart of a method to display a mark-up document, according to an aspect of the present invention. Referring to FIG. 8, at operation 801, the apparatus 200 to reproduce the data identifies a parental level set by a user. Thereafter, at operation 802, the apparatus 200 to reproduce the data identifies the class value allotted to the predetermined element of the mark-up document. At operation 803, the apparatus 200 to reproduce the data determines whether to display the predetermined element based upon the parental level identified at operation 801 and the class value allotted to the predetermined element and then displays the predetermined element.

Figure 9:
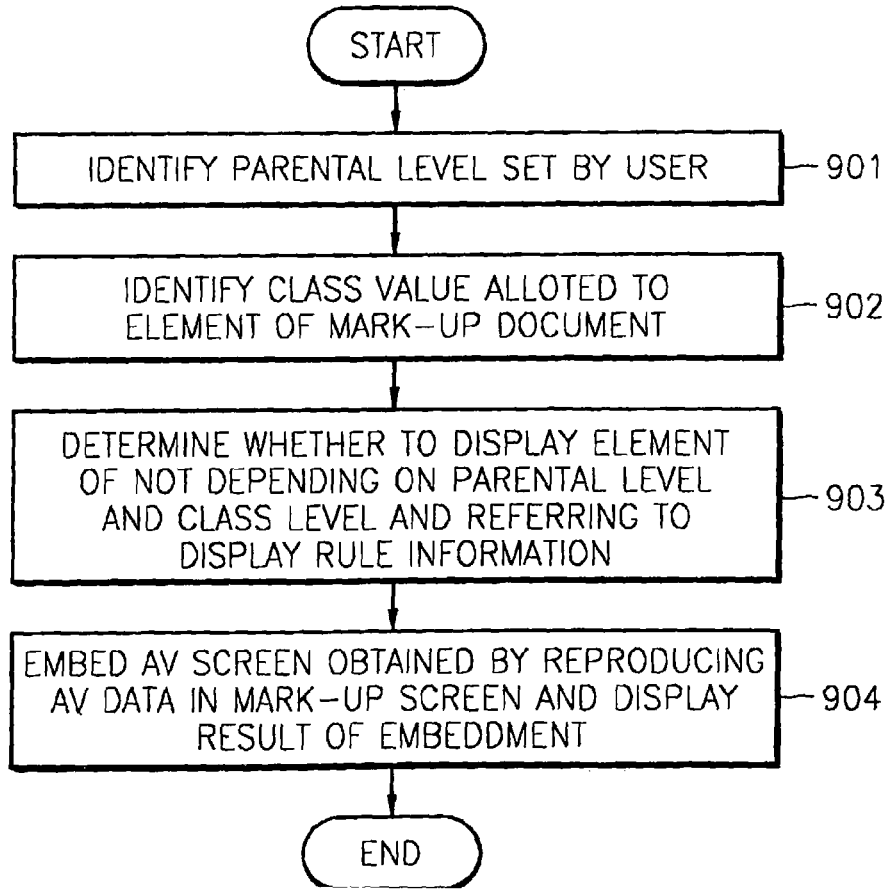
FIG. 9 is a flowchart of a method to reproduce AV data using the mark-up document, according to an aspect of the present invention.

FIG. 9 is a flowchart of the method to reproduce the AV data in the interactive mode using the mark-up document, according to an aspect of the present invention. Referring to FIG. 9, at operation 901, the apparatus 200 to reproduce the data identifies the parental level set by the user. Thereafter, the apparatus 200 to reproduce the data identifies the class value allotted to the predetermined element of the mark-up document at operation 902. At operation 903, the apparatus 200 to reproduce the data determines whether to display the predetermined element based upon the parental level identified at operation 901 and the class value and with reference to display the rule information at operation 903. The apparatus 200 to reproduce the data embeds the AV screen obtained by reproducing the AV data in the mark-up screen and displays a result of the embedment at operation 904.

As described above, the present invention provides a data storage medium on which a mark-up document is recorded so that whether to display interactive content inappropriate for minors or not can be controlled in an interactive mode, and a method and a system to reproduce data from the data storage medium. Accordingly, it is possible to control whether to display such inappropriate interactive content or not according to DVD-video standards. In addition, according to an aspect of the present invention, elements of the mark-up document are graded so that the mark-up document can be displayed in different ways depending on an age of a viewer.

Although a few aspects of the present invention have been shown and described, it would be appreciated by those skilled in the art that changes might be made in this embodiment without departing from the principles and spirit of the invention, the scope of which is defined in the claims and their equivalents.

What is claimed is:

1. A method of reproducing data recorded on a data storage medium performed in a reproduction apparatus in which the data storage medium is loaded, the data comprising
audio/video (AV) data, and
mark-up documents to reproduce the AV data in an interactive mode when the mark-up documents are interpreted by a presentation engine of the reproduction apparatus, the mark-up documents comprising
a plurality of mark-up documents corresponding to different parental levels, and
a start-up mark-up document specifying which one of the plurality of mark-up documents corresponding to different parental levels is to be interpreted by the presentation engine depending on a parental level set in the reproduction apparatus, the method comprising:
reading the start-up mark-up document from the data storage medium;
identifying the parental level set in the reproduction apparatus;
reading one of the plurality of mark-up documents corresponding to the different parental levels that the read start-up mark-up document specifies is to be interpreted by the presentation engine for the identified parental level set in the reproduction apparatus;
interpreting the read one of the plurality of mark-up documents using the presentation engine of the reproduction apparatus to display a mark-up screen having an AV screen embedded therein;

reading the AV data from the data storage medium;
decoding the read AV data to reproduce the AV data; and
displaying the reproduced AV data on the AV screen embedded in the mark-up screen.

2. The method of claim 1, wherein the start-up mark-up document comprises meta-information indicating a parental level of the mark-up documents; and wherein the reading of one of the plurality of mark-up documents corresponding to the different parental levels from the data storage medium comprises:

comparing the parental level indicated by the meta-information with the identified parental level set in the reproduction apparatus;

selecting one of the plurality of mark-up documents corresponding to different parental levels based on a result of the comparing; and reading the selected one of the plurality of mark-up documents corresponding to different parental levels from the data storage medium.

3. The method of claim 1, wherein the plurality of mark-up documents comprising to different parental levels comprise a warning mark-up document to display a warning message on the mark-up screen that interactive contents associated with the AV data cannot be displayed; and wherein when the parental level indicated by the meta-information is higher than the identified parental level set in the reproduction apparatus, the selected one of the plurality of mark-up documents is the warning mark-up document.

4. A method of reproducing data recorded on a data storage medium performed in a reproduction apparatus in which the data storage medium is loaded, the data storage medium comprising
a video directory,
audio/video (AV) data stored in the video directory,
an interactive directory, and
mark-up documents, stored in the interactive directory, to reproduce the AV data in an interactive mode when the mark-up documents are interpreted by a presentation engine of the reproduction apparatus, the interactive directory comprising a plurality of sub-directories corresponding to a plurality of different parental levels, the mark-up documents comprising
a plurality of mark-up documents corresponding to the plurality of different parental levels stored in corresponding ones of the plurality of sub-directories corresponding to the plurality of different parental levels, and
a start-up mark-up document comprising link information identifying locations of the plurality of mark-up documents corresponding to the plurality of different parental levels, the method comprising:
reading the start-up mark-up document from the data storage medium;
identifying a parental level set in the reproduction apparatus;
reading one of the plurality of mark-up documents corresponding to the plurality of different parental levels that corresponds to the identified parental level set in the reproduction apparatus from one of the sub-directories corresponding to the plurality of different parental levels that corresponds to the identified parental level set in the reproduction apparatus based on the link information in the read start-up mark-up document;

interpreting the read one of the plurality of mark-up documents using the presentation engine of the reproduction apparatus to display a mark-up screen having an AV screen embedded therein;

reading the AV data from the data storage medium;
decoding the read AV data to reproduce the AV data; and
displaying the reproduced AV data on the AV screen embedded in the mark-up screen.

5. A method of reproducing data recorded on a data storage medium performed in a reproduction apparatus in which the data storage medium is loaded, the data comprising
audio/video (AV) data, and
mark-up documents to reproduce the AV data in an interactive mode when the mark-up documents are interpreted by a presentation engine of the reproduction apparatus, the mark-up documents comprising a mark-up document comprising display rule information for a plurality of different parental levels, the method comprising:
reading the mark-up documents and the AV data from the data storage medium;
decoding the read AV data to reproduce the AV data;
interpreting the read mark-up documents using the presentation engine of the reproduction apparatus to generate a mark-up screen having an AV screen embedded therein; and
blending the generated mark-up screen and the reproduced AV data so that the reproduced AV data is displayed on the AV screen embedded in the mark-up screen;

wherein the interpreting comprises:
identifying a value of a predetermined attribute of an element of one of the read mark-up documents; and
determining whether to display the element on the mark-up screen depending on the identified value of the predetermined attribute, the display rule information, and a parental level set in the reproduction apparatus.

6. A method of reproducing data recorded on a data storage medium performed in a reproduction apparatus in which the data storage medium is loaded, the data comprising
audio/video (AV) data, and
mark-up documents to reproduce the AV data in an interactive mode by displaying the AV data on an AV screen embedded in a mark-up screen displaying interactive contents associated with the AV data when the mark-up documents are interpreted by a presentation engine of the reproduction apparatus, the mark-up documents comprising
a warning mark-up document to display a warning message on the mark-up screen that the interactive contents associated with the AV data cannot be displayed, and
a start-up mark-up document comprising
information indicating a parental level of the mark-up documents, and
information identifying a location of the warning mark-up document, the method comprising:
selecting the interactive mode of the reproduction apparatus;
reading the mark-up documents and the AV data from the data storage medium;
identifying a parental level set in the reproduction apparatus;

interpreting the start-up mark-up document in the read mark-up documents with the presentation engine of the reproduction apparatus to identify the parental level of the mark-up documents;

comparing the parental level of the mark-up documents identified by interpreting the start-up mark-up document in the read mark-up documents with the identified parental level set in the reproduction apparatus;

interpreting the warning mark-up document in the read mark-up documents with the presentation engine of the presentation engine of the reproduction apparatus based on the information in the start-up mark-up document identifying the location of the warning mark-up document to display the warning message indicating that the interactive contents associated with the AV data cannot be displayed if a result of the comparing indicates that the parental level of the mark-up documents identified by interpreting the start-up mark-up document is higher than the identified parental level set in the reproduction apparatus; and reproducing the read AV data and displaying the interactive contents associated with the AV data if the result of the comparing indicates that the parental level of the mark-up documents identified by interpreting the start-up document is not higher than the identified parental level set in the reproduction apparatus.

7. A method of reproducing data recorded on a data storage medium performed in a reproduction apparatus in which the data storage medium is loaded, the data comprising
audio/video (AV) data, and
mark-up documents to reproduce the AV data in an interactive mode by displaying the AV data on an AV screen embedded in a mark-up screen displaying interactive contents associated with the AV data when the mark-up documents are interpreted by a presentation engine of the reproduction apparatus, the mark-up documents comprising a mark-up document comprising display rule information for a plurality of different parental levels, the method comprising:

reading the mark-up documents and the AV data from the data storage medium;

identifying a parental level set in the reproduction apparatus;

identifying a value of a class attribute of an element of one of the read mark-up documents;

interpreting the mark-up document comprising the display rule information for the plurality of different parental levels using the presentation engine of the reproduction apparatus to determine whether to display the element the identified value of the class attribute, the display rule information, and the identified parental level set in the reproduction apparatus; and interpreting the mark-up documents using the presentation engine of the reproduction apparatus to display the mark-up screen having the AV screen embedded therein based on a result of the determining.

8. The method of claim 5, wherein the display rule information is written according to cascading style sheets (CSS) rules.

9. The method of claim 8, wherein the display rule information is written in a form of a CSS file.

10. The method of claim 5, wherein the predetermined attribute is a class attribute.

11. The method of claim 5, wherein the display rule information for each of the plurality of different parental levels comprises individual display rule information for each higher one of the plurality of different parental levels.

* * * * *